(12) United States Patent
Garland

(10) Patent No.: US 9,629,445 B2
(45) Date of Patent: Apr. 25, 2017

(54) CARRYING ASSEMBLY

(71) Applicant: Tina Garland, Wappingers Falls, NY (US)

(72) Inventor: Tina Garland, Wappingers Falls, NY (US)

( * ) Notice: Subject to any disclaimer, the term of this patent is extended or adjusted under 35 U.S.C. 154(b) by 0 days.

(21) Appl. No.: 14/810,644

(22) Filed: Jul. 28, 2015

(65) Prior Publication Data
US 2017/0027310 A1   Feb. 2, 2017

(51) Int. Cl.
*A45F 5/00* (2006.01)

(52) U.S. Cl.
CPC .......... *A45F 5/00* (2013.01); *A45F 2005/008* (2013.01)

(58) Field of Classification Search
CPC .... A41D 13/08; A41D 13/082; A41D 13/088; A41D 13/081; A41D 19/00; A45F 2005/008
USPC ......... 224/270, 267, 907; D29/120.1; 2/162, 2/16, 161.6, 161.8
See application file for complete search history.

(56) References Cited

U.S. PATENT DOCUMENTS

| | | | | |
|---|---|---|---|---|
| 546,208 | A * | 9/1895 | West | A45F 5/00 224/222 |
| 4,628,544 | A * | 12/1986 | Erickson | A41D 13/082 2/158 |
| D300,676 | S | 4/1989 | Pierce, Jr. | |
| 4,967,419 | A * | 11/1990 | Elliott | A41D 13/08 2/16 |
| 5,335,888 | A * | 8/1994 | Thomsen | A47B 21/0371 2/16 |
| 5,737,771 | A * | 4/1998 | Aanonsen | A41D 13/08 2/16 |
| 6,240,565 | B1 * | 6/2001 | Spear | A41D 13/08 2/158 |
| 6,430,744 | B1 | 8/2002 | Redman et al. | |
| 6,775,844 | B1 | 8/2004 | Castillo | |
| 6,931,666 | B1 * | 8/2005 | Brady | A41D 13/08 2/16 |
| 7,200,870 | B1 | 4/2007 | Kolk | |
| 2004/0226075 | A1 * | 11/2004 | Marchal | A41D 19/0044 2/160 |
| 2012/0204321 | A1 * | 8/2012 | Connelly | A41D 19/04 2/161.6 |
| 2012/0307506 | A1 * | 12/2012 | Gunn | F21L 4/005 362/382 |

* cited by examiner

*Primary Examiner* — Nathan J Newhouse
*Assistant Examiner* — Scott McNurlen

(57) ABSTRACT

A carrying assembly includes a support that may be worn on an arm of a user. The support may have a hot object place thereon thereby facilitating the user to carry the hot object without being burned by the hot object. The support comprises a tube that may be worn on the user's arm. A pad is coupled to the tube such that the pad may have the hot object positioned thereon. A grip is coupled to the tube such that the grip may be gripped.

8 Claims, 4 Drawing Sheets

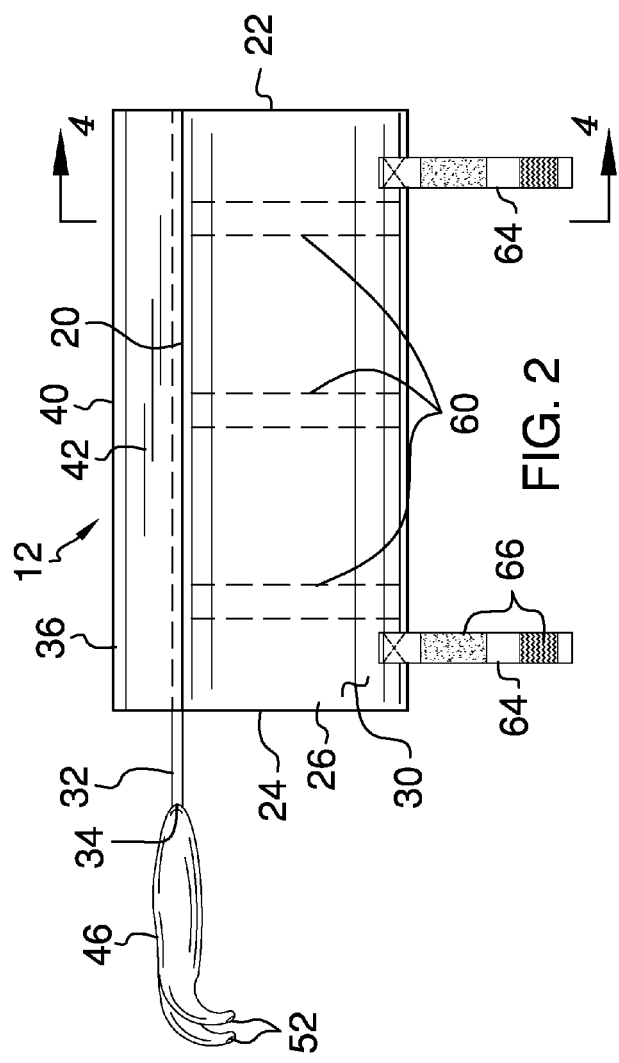
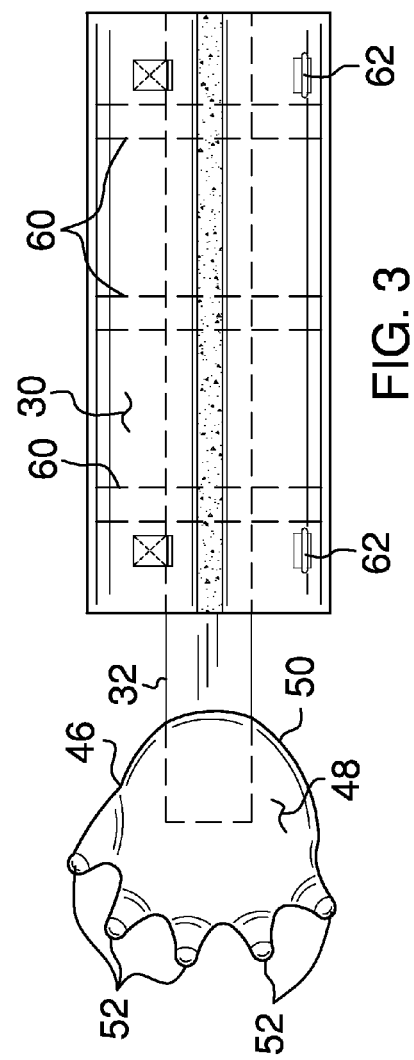

CARRYING ASSEMBLY

BACKGROUND OF THE DISCLOSURE

Field of the Disclosure

The disclosure relates to carrying devices and more particularly pertains to a new carrying device to facilitate a user to carry a hot object without being burned by the hot object.

SUMMARY OF THE DISCLOSURE

An embodiment of the disclosure meets the needs presented above by generally comprising a support that may be worn on an arm of a user. The support may have a hot object place thereon thereby facilitating the user to carry the hot object without being burned by the hot object. The support comprises a tube that may be worn on the user's arm. A pad is coupled to the tube such that the pad may have the hot object positioned thereon. A grip is coupled to the tube such that the grip may be gripped.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a left side view of an embodiment of the disclosure.

FIG. 3 is a bottom view of an embodiment of the disclosure.

DESCRIPTION OF THE PREFERRED EMBODIMENT

Figure 1:
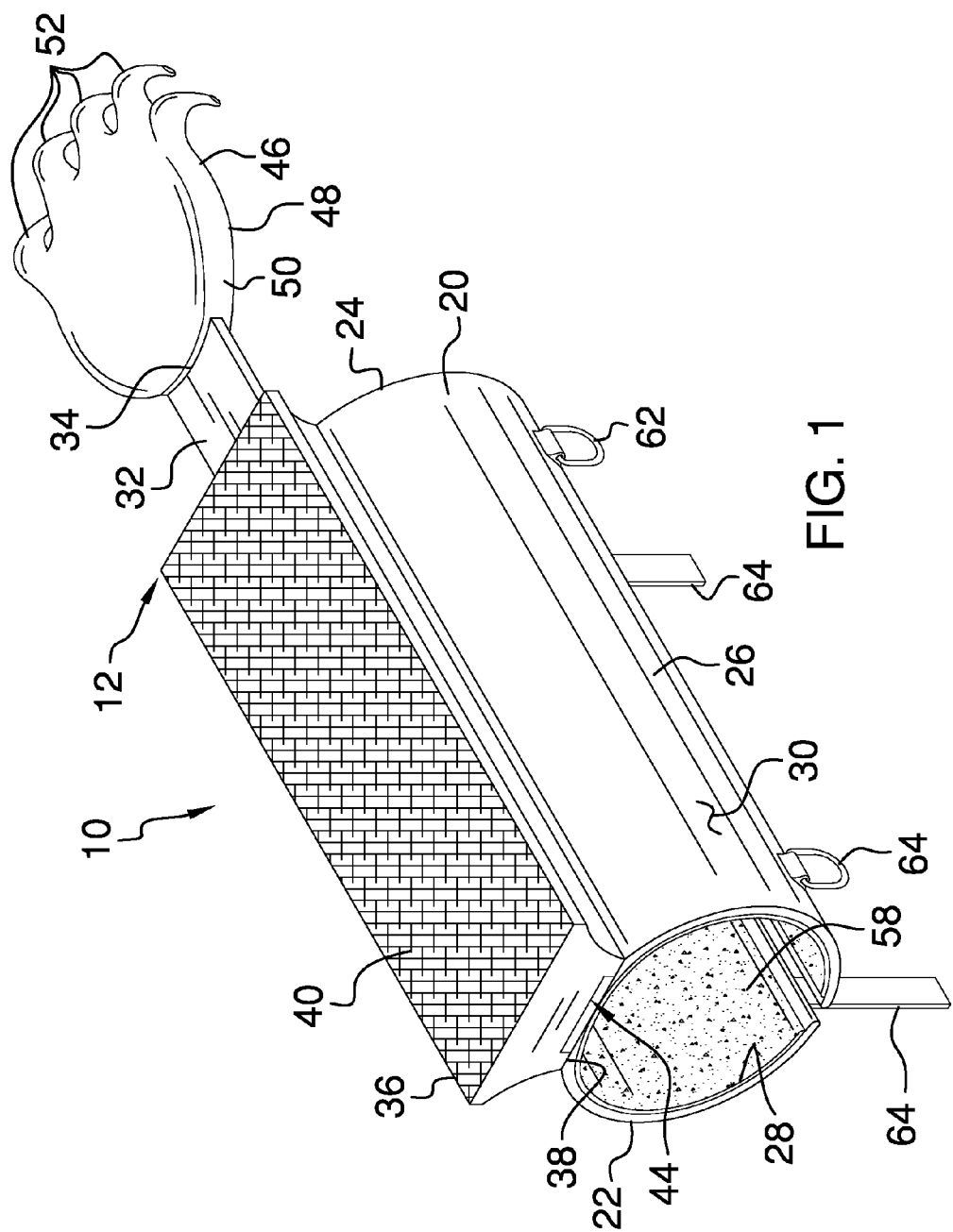
FIG. 1 is a top perspective view of a carrying assembly according to an embodiment of the disclosure.
Figure 4:
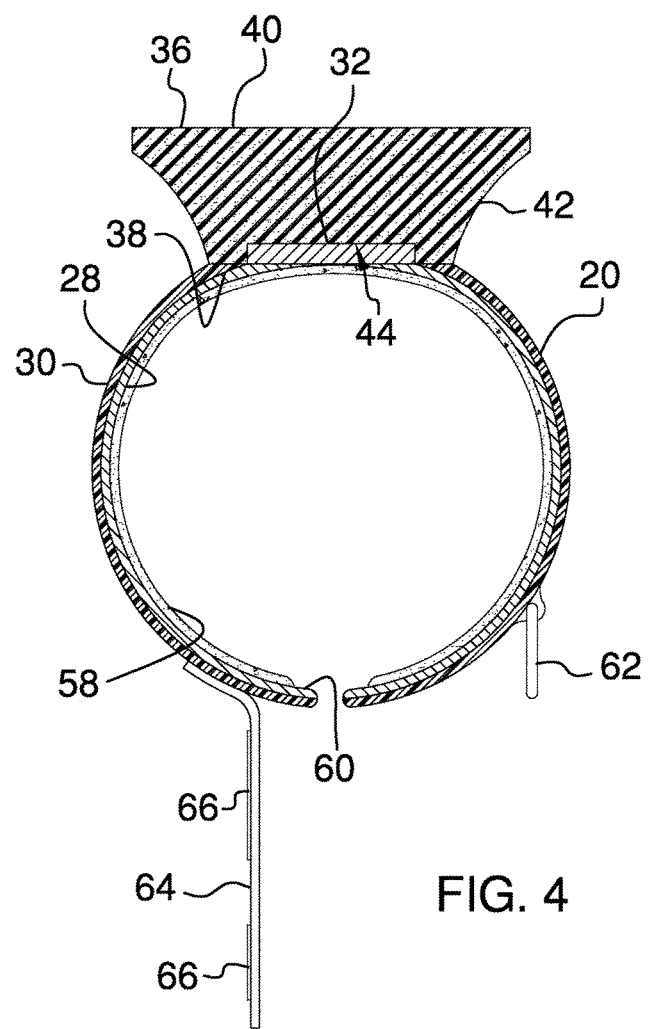
FIG. 4 is a cross sectional view taken along line 4-4 of FIG. 3 of an embodiment of the disclosure.
Figure 5:
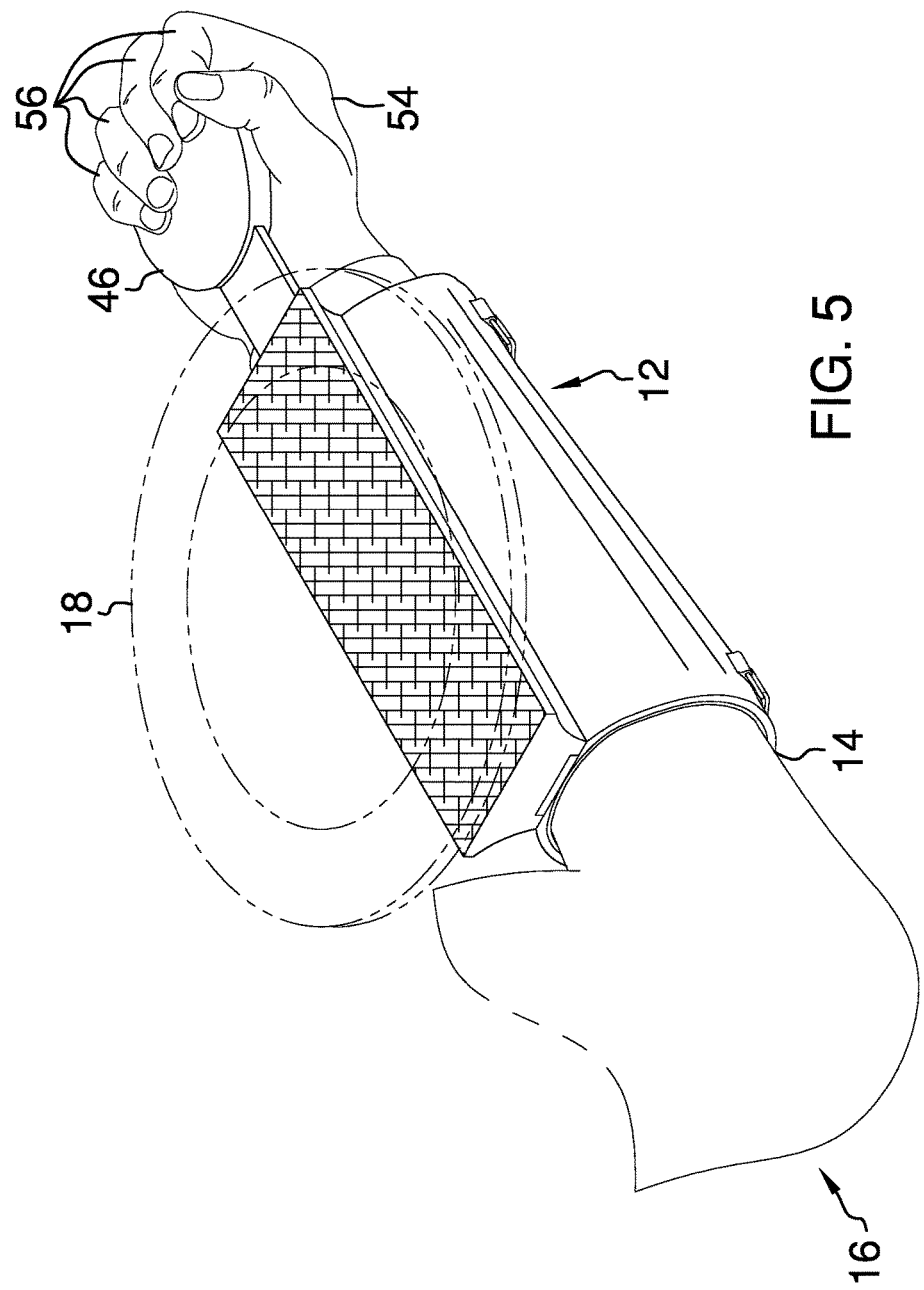
FIG. 5 is a perspective in-use view of an embodiment of the disclosure.

With reference now to the drawings, and in particular to FIGS. 1 through 5 thereof, a new carrying device embodying the principles and concepts of an embodiment of the disclosure and generally designated by the reference numeral 10 will be described.

As best illustrated in FIGS. 1 through 5, the carrying assembly 10 generally comprises a support 12 that may be worn on an arm 14 of a user 16. The support 12 may have a hot object 18 placed thereon thereby facilitating the user 16 to carry the hot object 18 without being burned by the hot object 18. The hot object 18 may be a dinner plate or the like and the user 16 may be a food service worker or the like.

The support 12 comprises a tube 20 that has a first end 22, a second end 24 and an outer wall 26 extending between the first end 22 and the second end 24. The outer wall 26 has an inner surface 28 and an outer surface 30. The outer wall 26 is longitudinally split between the first end 22 and the second end 24 such that the tube 20 may accommodate a variety of sizes of arms. The first end 22 may have the user's arm 14 extended therethrough such that the user's arm 14 extends outwardly from the second end 24.

A bar 32 is coupled to the tube 20. The bar 32 is positioned on the outer surface 30 of the tube 20. The bar 32 is positioned on an opposite side of the tube 20 with respect to the longitudinal split. The bar 32 has a distal end 34 with respect to the second end 24 and the bar 32 is aligned with the first end 22.

A pad 36 is provided that has a bottom side 38, a top side 40 and a peripheral surface 42 extending between the top side 40 and the bottom side 38. The peripheral surface 42 is concavely arcuate between the bottom side 38 and the top side 40. Thus, the top side 40 has a width that is greater than a width of the bottom side 38 such that the top side 40 may support the hot object 18. The pad 36 may be comprised of a resiliently compressible and heat resistant material such as neoprene or the like. The bottom side 38 has a slot 44 extending longitudinally along the pad 36. The bottom side 38 is coupled to the outer surface 30 of the tube 20 having the bar 32 being positioned within the slot 44. The pad 36 extends between the first end 22 and the second end 24.

A grip 46 is provided and the grip 46 has a bottom surface 48 and a peripheral edge 50. The peripheral edge 50 is curved such that the grip 46 is substantially disk shaped. The peripheral edge 50 has a plurality of fingers 52 extending away from and extending downwardly from the grip 46. The fingers 52 are spaced apart from each other and are substantially distributed around the peripheral edge 50. The peripheral edge 50 is coupled to the distal end 34 of the bar 32 such that the fingers 52 are directed away from the tube 20. The bottom surface 48 may have a hand 54 of the user 16 positioned thereon. Each of the user's fingers 56 may extend upwardly between each of the fingers 52 on the grip 46 thereby facilitating the tube 20 to be stabilized on the user's arm 14.

A cushion 58 is coupled to the inner surface 28 of the tube 20 such that the cushion 58 enhances a comfort of the tube 20. The cushion 58 substantially covers the inner surface 58 and the cushion 58 extends between the first end 22 and the second end 24. A plurality of bands 60 is each coupled to the inner surface 28 such that the bands 60 are positioned between the cushion 58 and the tube 20. Each of the bands 60 substantially extends around a circumference of the tube 20 such that the bands 60 enhance a rigidity of the tube 20. The bands 60 are spaced apart from each other and are distributed between the first end 22 and the second end 24.

A pair of rings 62 is provided and each of the rings 62 is movably coupled to the outer surface 30 of the tube 20. The rings 62 are spaced apart from each other. A pair of straps 64 is each coupled to the outer surface 30 and each of the straps 64 is aligned with an associated one of the rings 62. Each of the straps 64 is extended through the associated ring 62 such that each of the straps 64 retains the tube 20 on the user's arm 14.

Each of the straps 64 has a pair of couplers 66 attached thereto. The couplers 66 on each of the straps 64 are spaced apart from each other. The couplers 66 on each of the straps 64 are complementary with each other such that each of the straps 64 is removably coupled to the associated ring 62. The couplers 66 on each of the straps 64 may comprise a hook and loop fastener or the like.

In use, the tube 20 is worn on the user's arm 14 and the straps 64 are coupled to the rings 62 to retain the tube 20 on the user's arm 14. The grip 46 is gripped and the hot object 18 is placed on the top side 40 of the pad 36. The hot object 18 is transported while the hot object 18 is placed on the pad 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A carrying assembly configured to support an object on an arm of a user, said assembly comprising:
   a support being configured to be worn on an arm of a user, said support being configured to have a hot object placed thereon thereby facilitating the user to carry the hot object without being burned by the hot object, said support comprising:
      a tube being configured to be worn on the user's arm,
      a pad being coupled to said tube wherein said pad is configured to have the hot object positioned thereon, and
      a grip being coupled to said tube wherein said grip is configured to be gripped;
   wherein said tube has a first end, a second end and an outer wall extending between said first end and said second end, said outer wall having an inner surface and an outer surface, said outer wall being longitudinally split between said first end and said second end wherein said tube is configured to accommodate a variety of sizes of arms, said first end being configured to have the user's arm extended therethrough such that the user's arm extends outwardly from said second end;
   wherein said pad has a bottom side, a top side and a peripheral surface extending between said top side and said bottom side, said peripheral surface being concavely arcuate between said bottom side and said top side such that said top side has a width being greater than a width of said bottom side wherein said top side is configured to support the hot object;
   a bar; and
   said bottom side having a slot extending longitudinally along said pad, said bottom side being coupled to said outer surface of said tube having said bar being positioned within said slot, said pad extending between said first end and said second end.

2. The assembly according to claim 1, wherein said grip has a bottom surface and a peripheral edge, said peripheral edge being curved such that said grip is disk shaped, said peripheral edge having a plurality of fingers extending away from and extending downwardly from said grip, said fingers being spaced apart from each other and being substantially distributed around said peripheral edge.

3. The assembly according to claim 1, further comprising a cushion being coupled to said inner surface of said outer wall wherein said cushion is configured to enhance a comfort of said tube, said cushion substantially covering said inner surface, said cushion extending between said first end and said second end.

4. The assembly according to claim 1, further comprising a plurality of bands, each of said bands being coupled to said inner surface, each of said bands substantially extending around a circumference of said tube such that said bands enhance a rigidity of said tube, said bands being spaced apart from each other and being distributed between said first end and said second end.

5. The assembly according to claim 1, further comprising a pair of rings, each of said rings being movably coupled to said outer surface of said tube, said rings being spaced apart from each other.

6. The assembly according to claim 5, further comprising a pair of straps, each of said straps being coupled to said outer surface, each of said straps being aligned with an associated one of said rings, each of said straps being extended through said associated ring wherein each of said straps is configured to retain said tube on the user's arm.

7. A carrying assembly configured to support an object on an arm of a user, said assembly comprising:
   a support being configured to be worn on an arm of a user, said support being configured to have a hot object placed thereon thereby facilitating the user to carry the hot object without being burned by the hot object, said support comprising:
      a tube being configured to be worn on the user's arm,
      a pad being coupled to said tube wherein said pad is configured to have the hot object positioned thereon,
      a grip being coupled to said tube wherein said grip is configured to be gripped, said grip having a bottom surface and a peripheral edge, said peripheral edge being curved such that said grip is disk shaped, said peripheral edge having a plurality of fingers extending away from and extending downwardly from said grip, said fingers being spaced apart from each other and being substantially distributed around said peripheral edge;
      a bar having a distal end; and
      said peripheral edge being coupled to said distal end of said bar such that said fingers are directed away from said tube, said bottom surface being configured to have a hand of the user positioned thereon having each of the user's fingers extending upwardly between each of said fingers on said grip thereby facilitating said tube to be stabilized on the user's arm.

8. A carrying assembly configured to support an object on an arm of a user, said assembly comprising:
   a support being configured to be worn on an arm of a user, said support being configured to have a hot object placed thereon thereby facilitating the user to carry the hot object without being burned by the hot object, said support comprising:

a tube having a first end, a second end and an outer wall extending between said first end and said second end, said outer wall having an inner surface and an outer surface, said outer wall being longitudinally split between said first end and said second end wherein said tube is configured to accommodate a variety of sizes of arms, said first end being configured to have the user's arm extended therethrough such that the user's arm extends outwardly from said second end, a bar being coupled to said tube, said bar being positioned on said outer surface of said outer wall such that said bar is positioned on an opposite side of said tube with respect to said longitudinal split, said bar having a distal end with respect to said second end, said bar being aligned with said first end, a pad having a bottom side, a top side and a peripheral surface extending between said top side and said bottom side, said peripheral surface being concavely arcuate between said bottom side and said top side such that said top side has a width being greater than a width of said bottom side wherein said top side is configured to support the hot object, said bottom side having a slot extending longitudinally along said pad, said bottom side being coupled to said outer surface of said tube having said bar being positioned within said slot, said pad extending between said first end and said second end, a grip having a bottom surface and a peripheral edge, said peripheral edge being curved such that said grip is substantially disk shaped, said peripheral edge having a plurality of fingers extending away from and extending downwardly from said grip, said fingers being spaced apart from each other and being substantially distributed around said peripheral edge, said peripheral edge being coupled to said distal end of said bar such that said fingers are directed away from said tube, said bottom surface being configured to have a hand of the user positioned thereon having each of the user's fingers extending upwardly between each of said fingers on said grip thereby facilitating said tube to be stabilized on the user's arm, a cushion being coupled to said inner surface of said outer wall wherein said cushion is configured to enhance a comfort of said tube, said cushion substantially covering said inner surface, said cushion extending between said first end and said second end, a plurality of bands, each of said bands being coupled to said inner surface such that said bands are positioned between said cushion and said tube, each of said bands substantially extending around a circumference of said tube such that said bands enhance a rigidity of said tube, said bands being spaced apart from each other and being distributed between said first end and said second end, a pair of rings, each of said rings being movably coupled to said outer surface of said tube, said rings being spaced apart from each other, and a pair of straps, each of said straps being coupled to said outer surface, each of said straps being aligned with an associated one of said rings, each of said straps being extended through said associated ring wherein each of said straps is configured to retain said tube on the user's arm.

* * * * *